(No Model.)

D. C. RIPLEY.
MANUFACTURE OF GLASSWARE.

No. 477,336. Patented June 21, 1892.

WITNESSES.

INVENTOR.

Daniel C. Ripley
by W. Bakewell & Sons
his Attorneys.

UNITED STATES PATENT OFFICE.

DANIEL C. RIPLEY, OF PITTSBURG, PENNSYLVANIA.

MANUFACTURE OF GLASSWARE.

SPECIFICATION forming part of Letters Patent No. 477,336, dated June 21, 1892.

Application filed January 9, 1891. Serial No. 377,198. (No model.)

*To all whom it may concern:*

Be it known that I, DANIEL C. RIPLEY, of Pittsburg, in the county of Allegheny and State of Pennsylvania, have invented a new and useful Improvement in the Manufacture of Glassware, of which the following is a full, clear, and exact description.

The object of my invention is to improve the manufacture of handled glassware—such as pitchers, mugs, &c.—and to provide means whereby a neat and shapely article can be produced without the cost which attends the separate manufacture and application of handles in the manner heretofore commonly practiced.

In making glassware in accordance with my invention I first form by pressing in a mold a glass blank having its neck portion completely shaped in the ultimate form desired and with a handle pressed integral with such completely-shaped neck portion and having below the same an unfinished hollow body of less size and of thicker walls than desired in the finished product. Then by means of blowing in a separate matrix or mold-cavity I expand the hollow body of the article, thinning its walls and increasing its internal diameter until it comes to the finished shape, but do not expand or alter the shape of that portion to which the handle is affixed.

The advantages of the invention are manifold. By its use the manufacture of handled glassware is expedited and cheapened and I am enabled to produce articles of form and style which could not be obtained by other modes of procedure.

I shall now proceed to describe my invention more particularly with reference to the accompanying drawings, in which—

Figure 1:
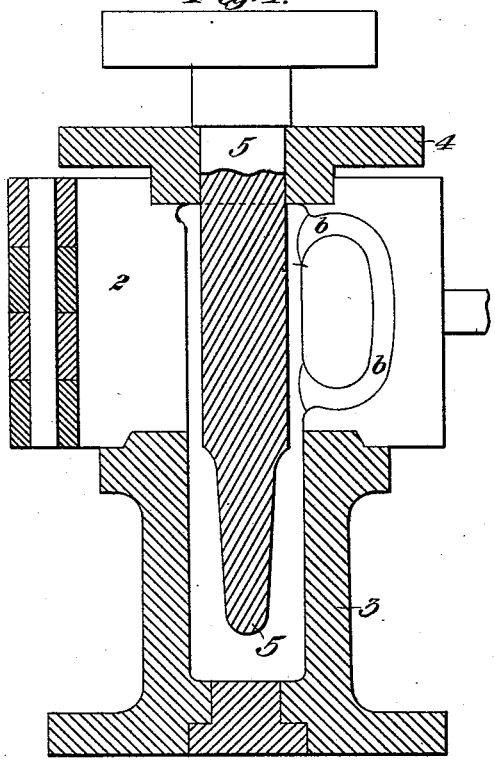
Figure 3:
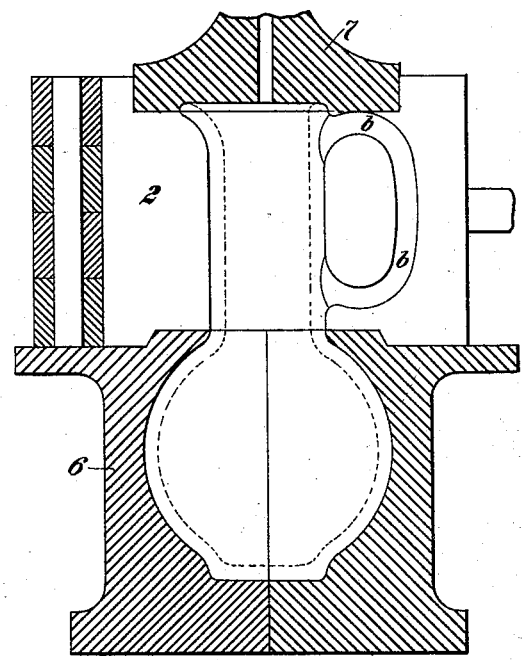
Figure 2:
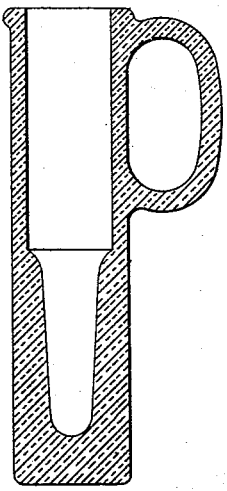
Figure 4:
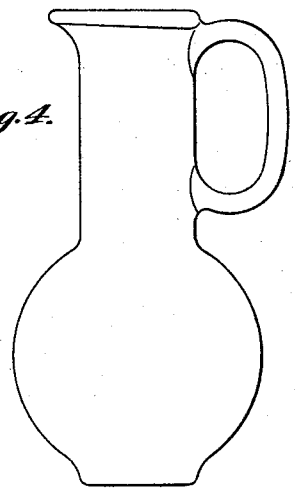

Figure 1 is a vertical section of molds adapted to make the blank from which the article is finally shaped. Fig. 2 is a sectional view of such blank. Fig. 3 is a vertical sectional view of the molds in which the article is completed. Fig. 4 is a side elevation of the finished article.

Like symbols of reference indicate like parts in each.

The mold shown in Fig. 1, which is adapted to the manufacture of the blank from which the article is finally expanded, comprises separable parts 2 and 3, of which the part 3 may be a cylindrical integral matrix, while the part 2 set above it is made of two or more parts, so that it can be opened and closed. The cavity of the part 2 is of the external shape of the neck of the glass article to be made and has a branch cavity $b$, (communicating at both ends with the main cavity,) in which the handle is molded.

4 is the usual ring set on top of the mold part 2. When the parts 2 and 3 are superposed, as shown in Fig. 1, a gathering of glass is introduced into the compound mold-cavity and by means of a plunger 5 is pressed so as to make a blank of the shape shown in Fig. 2. The plunger is then removed and the mold part 2, with the contained blank, is lifted from the part 3 and is placed on a mold part 6, Fig. 3, whose matrix conforms in shape and dimensions to the body of the finished article. A blow-pipe 7 is then placed on the mouth of the mold part 2, and by blowing air into the hollow blank its body portion is expanded and brought to the desired shape, the handle and neck remaining as before. The article is then finished and may be removed from the mold.

Modifications in the style of apparatus used in the practice of my invention may be made, and it will be understood that changes in form of the molds may be made to adapt them to make articles of various kinds.

Instead of finishing the blank in the mold shown in Fig. 3, the blank, after being removed from the molds of Fig. 1, may be snapped, reheated, and blown in another mold of suitable shape.

I claim—

In the manufacture of glassware, the improvement, which consists in pressing a glass blank having a finished neck portion, a finished handle portion integral with the neck portion, and an unfinished body portion wholly below the level of the finished portions, and then transferring the blank to a separate blow-mold and expanding the unfinished body portion therein by blowing, substantially as and for the purposes described.

In testimony whereof I have hereunto set my hand this 5th day of January, A. D. 1891.

DANIEL C. RIPLEY.

Witnesses:
THOMAS W. BAKEWELL,
W. B. CORWIN.